US008762051B2

(12) United States Patent
Hansen

(10) Patent No.: US 8,762,051 B2
(45) Date of Patent: Jun. 24, 2014

(54) METHOD AND SYSTEM FOR PROVIDING NAVIGATIONAL GUIDANCE USING LANDMARKS

(75) Inventor: Cody R. Hansen, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 173 days.

(21) Appl. No.: 13/224,693

(22) Filed: Sep. 2, 2011

(65) Prior Publication Data

US 2013/0060462 A1 Mar. 7, 2013

(51) Int. Cl.
*G01C 21/34* (2006.01)
(52) U.S. Cl.
USPC .......................................... 701/426; 701/428
(58) Field of Classification Search
USPC .................... 701/424, 426, 428, 430
See application file for complete search history.

(56) References Cited

U.S. PATENT DOCUMENTS

| 7,912,637 | B2* | 3/2011 | Horvitz et al. | 701/33.4 |
|---|---|---|---|---|
| 2006/0190167 | A1* | 8/2006 | Inukai | 701/209 |
| 2007/0032942 | A1* | 2/2007 | Thota | 701/200 |
| 2007/0115142 | A1* | 5/2007 | Nakashima | 340/995.1 |
| 2008/0262717 | A1* | 10/2008 | Ettinger | 701/206 |
| 2010/0174481 | A1* | 7/2010 | Kang | 701/201 |
| 2011/0238288 | A1* | 9/2011 | Li et al. | 701/201 |

* cited by examiner

*Primary Examiner* — Khoi Tran
*Assistant Examiner* — Robert Nguyen
(74) *Attorney, Agent, or Firm* — Cantor Colburn LLP

(57) ABSTRACT

A method and system of navigating a vehicle is provided. The method includes activating a navigational system that provides guidance to a destination point of interest ("POI"). The method also includes providing a database that stores at least one familiar POI and a plurality of standard POIs. The standard POIs represent stock locations. The method includes receiving a signal indicating a current geographical position of the vehicle. The method also includes determining if the current geographical position of the vehicle requires a maneuver within a specified distance. The method also includes selecting a plurality of proximate POIs. The proximate POIs are a portion of the standard POIs located within a proximate distance to a location where the maneuver will occur. The method includes comparing the familiar POI with the proximate POIs. The method includes determining if the familiar POI matches one of the proximate POIs.

15 Claims, 3 Drawing Sheets

METHOD AND SYSTEM FOR PROVIDING NAVIGATIONAL GUIDANCE USING LANDMARKS

FIELD OF THE INVENTION

Exemplary embodiments of the invention relate to a navigational system and, more particularly to a navigational system that directs a vehicle through a maneuver by selectively using a familiar point of interest ("POI") as a reference.

BACKGROUND

Navigational systems provide travel guidance for assisting a user in reaching a specific destination. Navigational systems typically detect a current position of a vehicle, and then calculate a guided route based on the current position of the vehicle and the specific destination. More specifically, the navigational system instructs a driver where to turn or which road to take by referring to a street name, or by a specific distance. For example, the navigation system may instruct a driver to turn left in seven hundred feet onto Maple Street.

Sometimes giving directions with reference to street names and addresses results in operator confusion. This is because some individuals do not understand directions that refer to a location simply by an address, or by a generic name. Specifically, some people may only understand directions if specific landmarks or places are referenced by a special name that is generally only known to them. For example, someone may not understand where "123 Riverside Drive" is located, but will immediately understand the same location if referred to as "Larry's house". Alternatively, some users may not understand a location by the address, but may understand where a location is situated if referred to by a name that describes the location. For example, someone may not understand where "456 Maple Street" is located, but will immediately understand the same location if referred to as "the public library" or a favorite restaurant. Accordingly, it is desirable to provide a navigational system that provides directions that are easier to understand by some people when compared to navigational systems that are currently available.

SUMMARY OF THE INVENTION

In one exemplary embodiment of the invention, a method and system of navigating a vehicle is provided. The method includes activating a navigational system that provides guidance to a destination point of interest ("POI"). The method also includes providing a database that stores at least one familiar POI and a plurality of standard POIs. The standard POIs represent a list of stock locations. The method includes receiving a signal indicating a current geographical position of the vehicle. The method also includes determining if the current geographical position of the vehicle requires a maneuver within a specified distance. The method also includes selecting a plurality of proximate POIs. The proximate POIs are a portion of the standard POIs located within a proximate distance to a location where the maneuver will occur. The method includes comparing the familiar POI with the proximate POIs. The method includes determining if the familiar POI matches one of the proximate POIs. The method also includes providing an indicator that directs the vehicle through the maneuver. The indicator uses the at least one familiar POI as a reference if the at least one familiar POI matches one of the plurality of proximate POIs.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
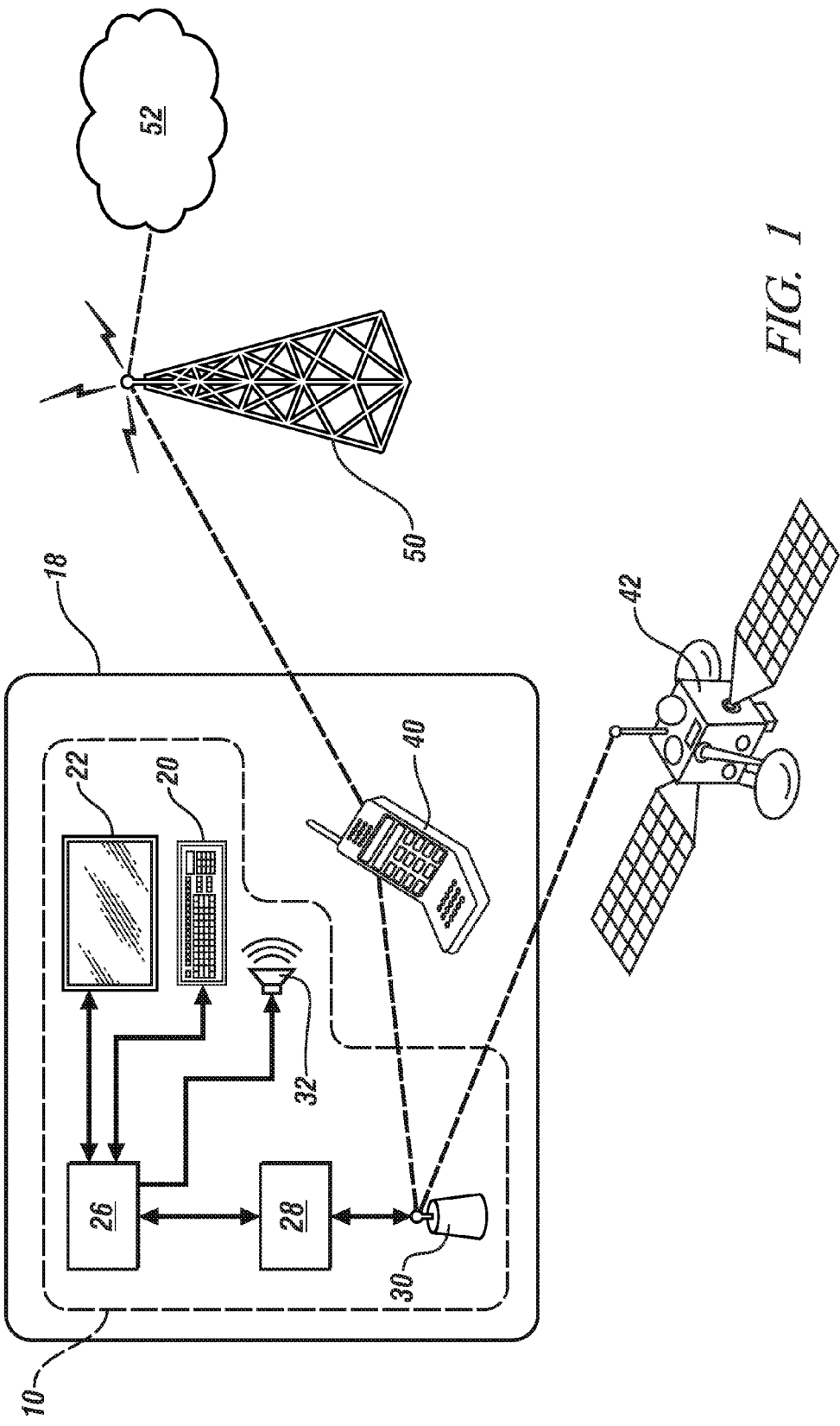
FIG. 1 is a schematic diagram of an exemplary navigational system employed in a vehicle.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to a navigational system 10 employed in a vehicle 18. The navigational system 10 includes a user input 20, a display 22, a control module 26, a transceiver 28, an antenna 30, and an audio system 32. The navigational system 10 may be in communication with a personal electronic device 40 as well as a navigational satellite 42. In one embodiment, the control module 26 is an embedded vehicle control module, however it is understood that the navigational system 10 may also be a stand-alone navigational system as well. In one embodiment, the control module 26 is in communication with the personal electronic device 40 through the transceiver 28 and the antenna 30 by a short-range wireless connection. The short-range wireless connection is typically any type of wireless signal for exchanging data over relatively short distances such as, for example, a Bluetooth® signal conforming to IEEE Standard 802.15 or a Wi-Fi® signal conforming to IEEE standard 802.11. Alternatively, in another embodiment the navigational system 10 may be in communication with the personal electronic device 40 through a cable or data link connection as well.

The personal electronic device 40 is typically any type of portable electronic device that is in communication with a network 50 for receiving an external communication. For example, the personal electronic device 40 may be a smartphone or a stand-alone navigational system. In one embodiment, the network 50 is a cellular network that includes several cellular sites 52 where antennas and electronic communications equipment are placed. The personal electronic device 40 includes a memory for storing at least one contact that indicates an address of a specific location. For example, the contact may indicate a contact name as well as an address that is associated with the contact name. Specifically, for example, a contact name may be the destination of "Larry's house", and the address may be "123 Riverside Drive".

In one embodiment, the personal electronic device 40 may include the capability to browse the Internet as well, and is in communication with a remotely located computer (not shown) over a network cloud 52. For example, in an alternative approach, the contact or contacts indicating an address of a specific location may be stored on a remotely located computer (not shown) located over the network cloud 52 instead of the memory of the personal electronic device 40. Specifically, a user may be able to access the contacts that are stored remotely on a website such as, for example, Google® by using the personal electronic device 40. Also, it should be noted that the contact or contact indicating an address of a specific location may also be stored on a memory of the control module 26 as well.

The user input 20 typically includes a keypad or a keyboard for allowing a user to input information. In one embodiment, the display 22 is a liquid crystal display ("LCD") screen, and is used to display graphics and text. In one example, the user input 20 and the display 22 are a combined unit, where the display is a touchscreen that detects the presence and location of a user's touch. The control module 26 is in communication with the user input 20, the display 22, the transceiver 28, the antenna 30, and the audio system 32. Although FIG. 1 illustrates the transceiver 28 and the antenna 30 as separate components from the control module 26, it is to be understood that the transceiver 28 and the antenna 30 may also be integrated with the control module 26 as well. The control module 26 is typically any type of control module for providing the vehicle 18 with navigational guidance. For example, the control module 26 may be a navigational or a telematics control module. In one embodiment the control module 26 provides navigational guidance to a destination point of interest ("POI"). A POI is typically any type of location that may be visited by a driver or passengers of the vehicle 18 such as, for example, a gas station, a hotel, a restaurant, a shopping mall, or a historical location.

In one embodiment, the navigational satellite 42 may be a global positioning system ("GPS") satellite, however it is understood that the navigational satellite 42 may be any type of device for sending a signal that indicates the current geographical position of the vehicle 18. The navigational satellite 42 typically sends a signal to the control module 26 through the transceiver 28 and the antenna 30. The control module 26 includes control logic for receiving the signal from the navigational satellite 42 and evaluates the signal to determine the current location of the vehicle based on the signal received from the navigational satellite 42. Specifically, in one embodiment, the control module 26 determines the latitude and longitudinal location coordinates of the vehicle 18 based on the signal received from the navigational satellite 42.

The navigational system 10 is employed to provide guidance to the destination POI by providing step-by-step directions to a user. The navigational system 10 provides directions by guiding a driver to the destination POI through a series of maneuvers. A maneuver is typically any type of change in direction of the vehicle 18 during driving. For example, a maneuver may be a highway on or off ramp maneuver, a right or left turn maneuver, a U-turn maneuver, an entrance or exit maneuver from a roundabout, a lane change maneuver, or a merging maneuver. The control module 26 includes control logic for providing an indicator that provides guidance to direct the vehicle 18 through a set of maneuvers that lead to the destination POI. Specifically, in one example, the control module 26 includes control logic for generating a graphic that is shown on the display 22 for instructing a driver where to turn. For example, the control module 26 may include control logic for generating a graphic that is shown on the display 22 that contains the text "turn right in 400 feet." The control module 26 may include control logic for also providing an audio signal that is transmitted over the audio system 32 for instructing a driver where to turn. For example, in one embodiment the control module 26 may include control logic for generating an audio signal that is transmitted over the audio system 32 that instructs a driver with verbal instructions to "turn right in 400 feet."

The navigational system 10 includes a database. Specifically, in one embodiment the database includes a map database that represents a road network including features such as various POIs, and buildings. The database is stored in the memory of the control module 26. The database also includes at least one familiar POI. In one embodiment, the familiar POI is the contact that indicates an address of a specific location. Specifically, the control module 26 is in communication with the personal electronic device 40 for obtaining the at least one contact that indicates an address of a specific location. Alternatively, in another embodiment, the contact or contacts indicating an address of a specific location are stored in a memory of the control module 26.

The familiar POI may also represent a POI that has been previously visited by the vehicle 18. For example, in one embodiment, the control module 26 includes control logic for obtaining feedback regarding a POI, if any, that is located proximate to the vehicle 18 during a vehicle stop. Specifically, each time the vehicle ignition (not shown in FIG. 1) is turned off, feedback is obtained by the control module 26 regarding the POI from the most recent vehicle stop. Specifically, the control module 26 generates and updates a history relating the vehicle 18 to various POIs. In one embodiment, the user history includes information as to how many times the POI has been visited, or a particular genre or type of POI. The user history may also include information indicating how long the user visited the POI.

In one embodiment, the familiar POI may be a chain establishment. A chain establishment is typically a retail establishment that shares a brand and central management with a group of other stores, and usually share standardized business methods and practices. A chain establishment may be, for example, a restaurant, a retail store that sells goods, or a retail store that provides services. For example, in one embodiment, the retail establishment may be a restaurant such as McDonald's®, a retail store such as Nordstrom's®, or an authorized service center, such as a General Motors® dealership. In one embodiment, the control module 26 may include graphical data that represents a branded icon that represents the chain establishment, where the branded icon may be shown on the display 22. For example, if the chain establishment is an authorized General Motors® dealership, then the control module 26 includes control logic for showing the General Motors® logo on the display 22.

The navigational system 10 is employed to provide guidance to the destination POI by guiding a driver to the destination POI through a series of maneuvers. Specifically, the control module 26 provides guidance to a driver by providing instructions that direct the driver of the vehicle 18 through the maneuver. The control module 26 may guide the driver of the vehicle 18 through the maneuver using at least one POI as a reference to guide the driver. The POI being used as a reference to guide the driver may be a standard POI that is stored in the map database of the control module 26. The standard POI represents the locations that are typically stored in the map database as stock locations. However, in the event that a familiar POI is available to guide a user through the maneuver, the familiar POI is utilized instead of any of the standard POIs stored in the map database.

For example, in the event the vehicle 18 is approaching an intersection where the vehicle 18 will need to turn right, the control module 26 includes control logic for determining all of the standard POIs that are located within a proximate distance to the maneuver. Specifically, the control module 26 includes control logic for searching the map database for all of the standard POIs that are located within the proximate distance to the intersection or location where the maneuver will take place. For example, in one embodiment, the proximate distance may be about thirty meters (which is about 100 feet). All of the standard POIs that are located within the proximate distance are designated as the proximate POIs. The control module 26 further includes control logic for comparing all of the proximate POIs with all of the familiar POIs.

In the event one of the proximate POIs matches the familiar POI, the familiar POI will be selected as a reference to guide the vehicle 18 through the maneuver. For example, if a familiar POI is selected, the navigational system 10 may provide an indicator that instructs the driver through the maneuver by referring to the familiar POI by an informal or colloquial name that is typically known to the driver. Specifically, in one example if the familiar POI is "Larry's house" having the address 123 Riverside Drive, then the control module 26 would include control logic for instructing at least one of the display 22 and the audio system 32 for providing either a visual or an audio indicator instructing a driver to "turn left in 400 feet, past Larry's house". In the example as discussed, the colloquial name for the familiar POI would be "Larry's house". Alternatively, in another embodiment, if the familiar POI is a chain establishment, then the control module 26 would include control logic for instructing a driver through the maneuver referring to the name of the chain establishment. However, in the event that none of the POIs proximate to the intersection match any of the familiar POIs, a proximate POI stored on the map database will be selected as a reference to guide the vehicle 18 through the maneuver.

Figure 2:
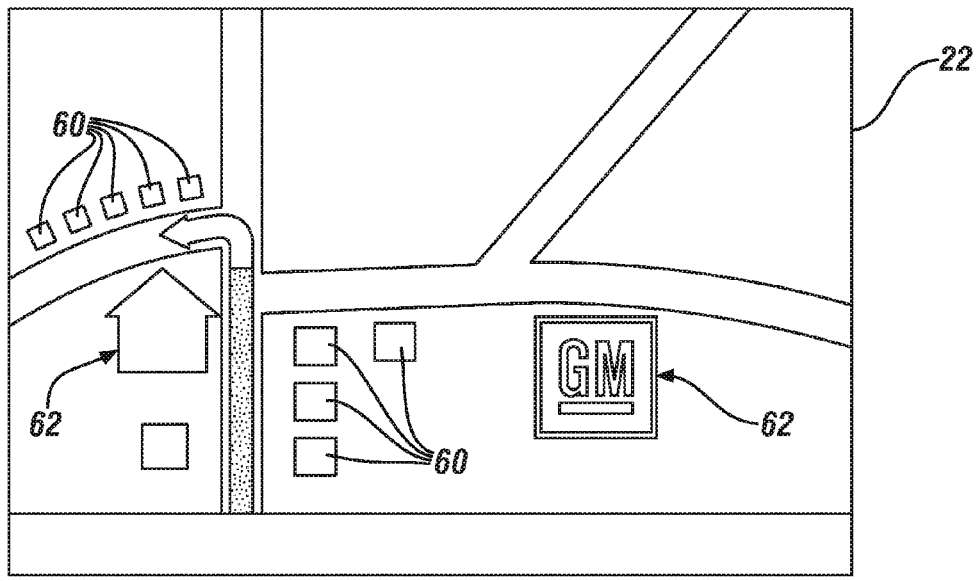
FIG. 2 is an exemplary illustration of a display shown in FIG. 1 showing a navigational guidance route.

Turning now to FIG. 2, an exemplary illustration of a navigational guidance route is shown on the display 22. The control module 26 includes control logic for generating a graphical image that represents the navigational guidance route on the display 22. The navigational guidance route includes the standard POIs stored on the map database, which are referred to by reference number 60. The navigational guidance route also includes two familiar POIs that are referred to by reference number 62. In the exemplary embodiment as shown in FIG. 2, the two familiar POIs are "Larry's house" as well as a General Motors® dealership. Specifically, "Larry's house" is shown using a house-shaped icon, and the General Motors® dealership is shown using the company logo. As shown in FIG. 2, the familiar POIs 62 may be displayed using a magnified or enlarged view when compared to the standard POIs 60. Also, in the event one of the familiar POIs is a chain establishment, then an enlarged icon illustrating the company logo may be shown. For example, FIG. 2 illustrates an authorized General Motors® dealership with an enlarged General Motors® logo that is shown on the display 22.

Utilizing a familiar POI to guide the vehicle 18 through a maneuver typically results in enhanced comprehension of a driver's surroundings. This is because at least some people may only understand directions if specific landmarks or places (i.e., Larry's house) are used as a reference. A familiar POI may be especially helpful in aiding a driver in a relatively new or unknown area.

Figure 3:
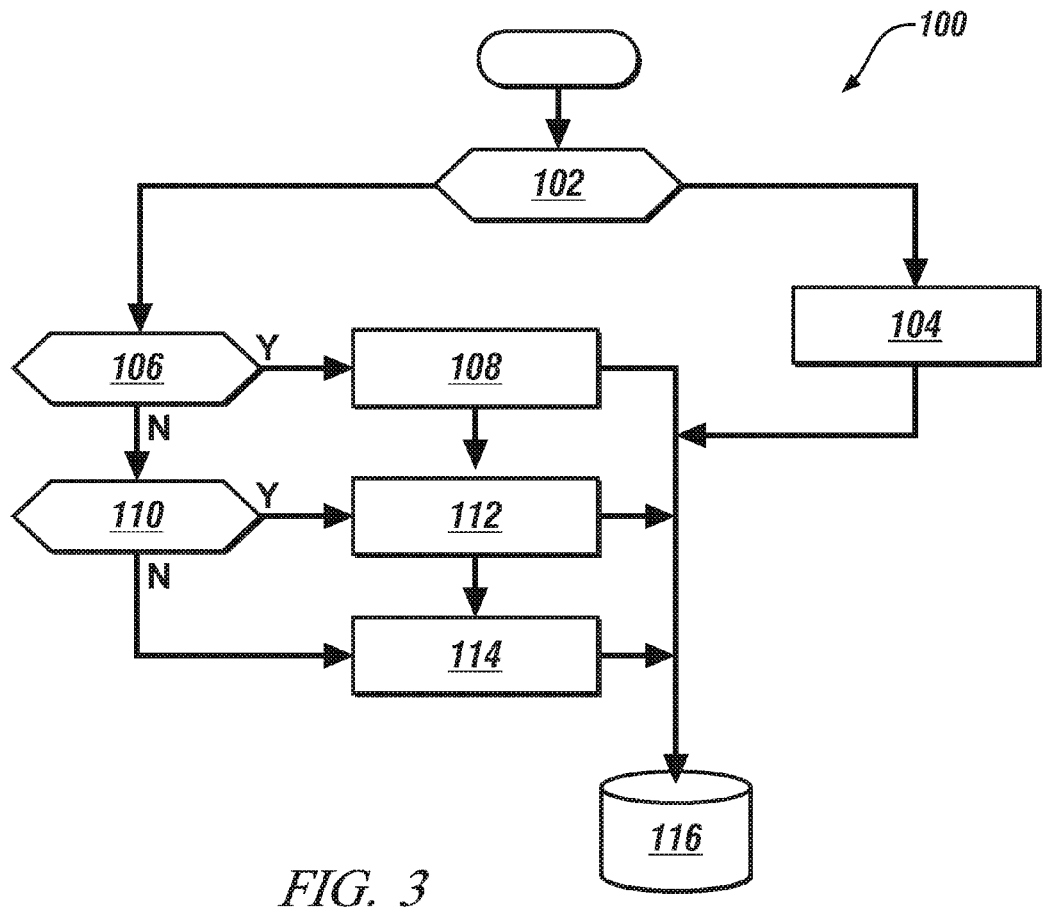
FIG. 3 is an illustration of a process flow diagram illustrating one approach for ranking familiar point of interests ("POIs")

FIG. 3 is a flowchart illustrating a process 100 of ranking the familiar POIs. Specifically, the control module 26 (FIG. 1) includes control logic for ranking the familiar POIs based on a number of factors. The control module 26 typically ranks the familiar POIs when the vehicle 18 is parked. Process 100 may begin at step 102 where the control module 26 includes control logic for determining if the vehicle 18 has reached a destination POI. If the vehicle 18 has reached the destination POI, then process 100 proceeds to step 106. In the event the vehicle 18 has not reached the destination POI, then process 100 proceeds to step 104.

In step 104, the control module 26 includes control logic for obtaining feedback regarding a POI, if any, that is located proximate to the vehicle during a vehicle stop. Specifically, each time the vehicle ignition (not shown) is turned off, feedback is obtained by the control module 26 regarding a POI, if any, from the most recent vehicle stop. The process 100 may then proceed to step 116, where the POI is then stored in the database of the control module 26. Process 100 may then terminate.

In step 106, the control module 26 includes control logic for comparing the POI, with the contact or contacts indicating an address of a specific location. In step 106, the POI is the destination POI that is selected by a user and is located within proximity to the vehicle 18 during a vehicle stop. In one embodiment, the POI may be located within about thirty meters (about 100 feet). In the event that the POI located within proximity to the vehicle 18 matches one of the contacts indicating an address of a specific location, then process 100 proceeds to step 108, and the POI located proximate to the vehicle 18 is designated as a high priority POI. The process 100 may then proceed to step 116, where the POI is then stored in the database of the control module 26. Process 100 may then terminate.

In the event that the POI located proximate to the vehicle 18 does not match one of the contacts indicating an address of a specific location, then process 100 proceeds to step 110. In step 110, the control module 26 includes control logic for determining if the POI, which is the destination POI, is located within proximity to the vehicle 18 during a vehicle stop is a chain establishment. As described above, a chain establishment is typically a retail establishment that shares a brand and central management and may be, for example, a restaurant, a retail store that sells goods, or a retail store that provides services. In the event the destination POI that is located within proximity to the vehicle 18 is a chain establishment, then process 100 proceeds to step 112, where the POI located proximate to the vehicle 18 is designated as a medium priority POI. The process 100 may then proceed to step 116, where the POI is then stored in the database of the control module 26. Process 100 may then terminate.

In the event that the destination POI that is located proximate to the vehicle 18 is not a chain establishment, then process 100 proceeds to step 114, where the POI located proximate to the vehicle 18 is established as a low priority POI. The process 100 may then proceed to step 116, where the POI is then stored in the database of the control module 26. Process 100 may then terminate.

It should be noted that the contact or contacts indicating an address of a specific location may also be stored in the database as a lowest priority POI. A high priority POI will be selected as a reference to guide the driver of the vehicle 18 through a maneuver before a medium priority POI. A medium priority POI will be selected before a low priority POI. A low priority POI will be selected before any of the lowest priority POIs. The control module 26 may also include control logic for updating the user history as to how many times a familiar POI has been visited or how long a user has visited the familiar POI. This information may be used to rank the familiar POIs according to user preference, where a more frequently visited POI may be used over a less frequently visited POI. For example, in one embodiment, if two different chain establishments are identified as potential references to guide the driver of the vehicle 18, the control module 26 includes control logic for determining which chain establishment has been more frequently visited by a user.

Figure 4:
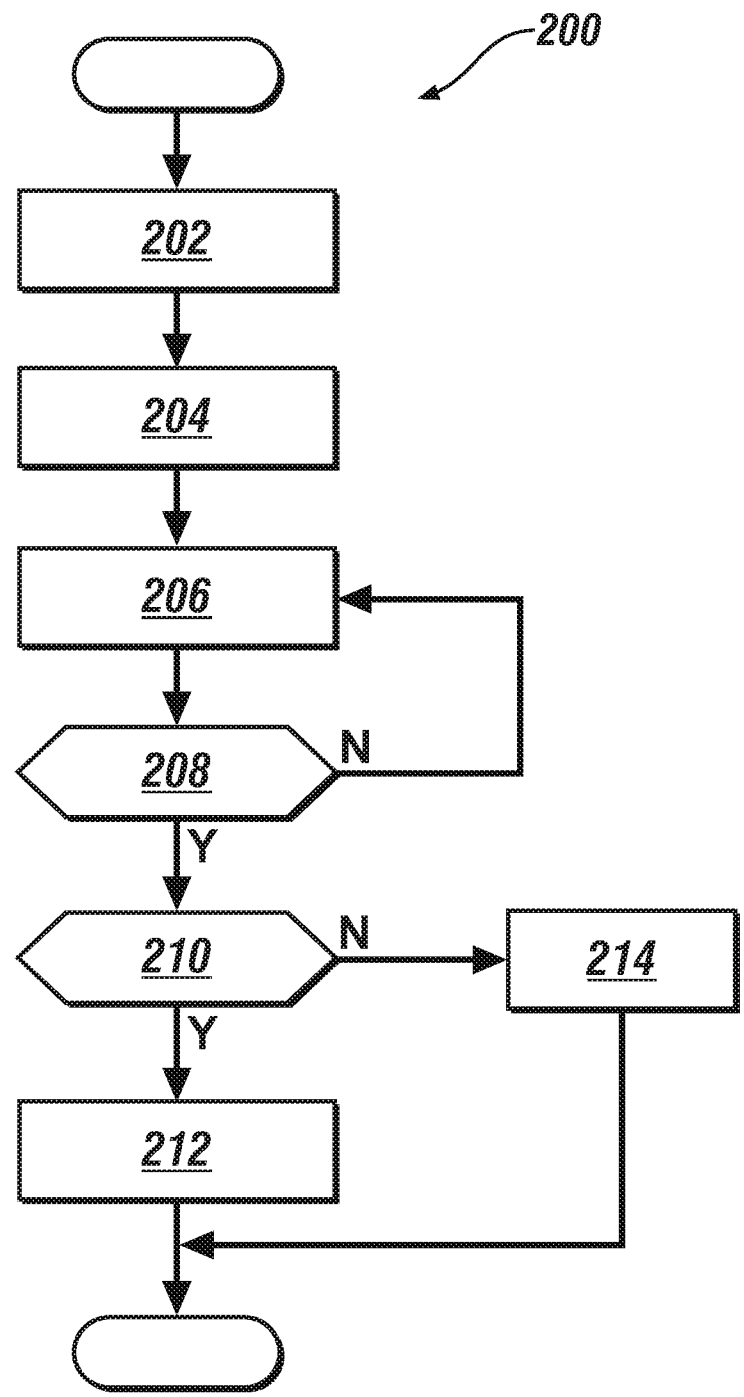
FIG. 4. is an illustration of a process flow diagram illustrating an approach for operating the navigational system illustrated in FIG. 1.

A method of operating the navigational system 10 will now be explained. Referring to FIG. 4, an exemplary process flow diagram illustrating an exemplary process of operating the navigational system 10 is generally indicated by reference number 200. Process 200 begins at step 202, where the navigational system 10 is activated. That is, a user inputs a destination POI using the user input 20 (FIG. 1), which activates the navigational system 10. Process 200 may then proceed to step 204.

In step 204, a database including a map database and at least one familiar POI is provided. The database is stored on a memory of the control module 26. Process 200 may then proceed to step 206.

In step 206, the control module 26 includes control logic for determining the current geographical position of a vehicle 18. Specifically, referring to FIG. 1, a navigational satellite 42 typically sends a signal to the control module 26 through a transceiver 28 and an antenna 30. The control module 26 includes control logic for receiving the signal from the navigational satellite 42 and evaluates the signal to determining the current location of the vehicle based on the signal received from the navigational satellite 42. Process 200 may then proceed to step 208.

In step 208, the control module 28 includes control logic for determining if the current geographical position of the vehicle 18 requires a maneuver within a specified distance. For example, in one embodiment, the control module 26 may determine if a maneuver is required within about 0.4 kilometers (which is about a quarter of a mile). If a maneuver is not required, then process 200 returns to step 206, where the current geographical position of the vehicle 18 is determined. In the event a maneuver is required, then process 200 proceeds to step 210.

In step 210, the control module 26 includes control logic for comparing the familiar POIs with a set of proximate POIs. Specifically, the control module 26 includes control logic for searching a map database for all of the standard POIs that are located within a proximate distance to the intersection or location where the maneuver will take place. For example, in one embodiment, the proximate distance may be about thirty meters (which is about 100 feet). All of the standard POIs that are located within the proximate distance are designated as the proximate POIs. In the event one of the proximate POIs matches one of the familiar POI, process 200 may then proceed to step 212. In step 212, the familiar POI that matches one of the proximate POIs will be selected as a reference to guide the vehicle 18 through the maneuver. In the event that multiple familiar POIs are found that match one of the proximate POIs, then the familiar POI with the highest ranking will be selected as a reference to guide the vehicle 18 through the maneuver. Specifically, as described above, a high priority POI will be selected as a reference to guide the driver of the vehicle 18 through a maneuver before a medium priority POI. A medium priority POI will be selected before a low priority POI. A low priority POI will be selected before any of the lowest priority POIs. Process 200 may then terminate.

In the event that none of the proximate POIs match any of the familiar POIs, method 200 proceeds to step 214. In step 214, any one of the proximate POIs stored on the map database will be selected as a reference to guide the vehicle 18 through the maneuver. Process 200 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of navigating a vehicle to a destination point of interest ("POI"), comprising:
    activating a navigational system having a processor, to provide guidance to the destination POI;
    providing a database that stores at least one familiar POI and a plurality of standard POIs, wherein the plurality of standard POIs represent stock locations;
    receiving a signal indicating a current geographical position of the vehicle;
    determining if the current geographical position of the vehicle requires a maneuver within a specified distance;
    selecting a plurality of proximate POIs, wherein the plurality of proximate POIs are a portion of the plurality of standard POIs located within a proximate distance to a location where the maneuver will occur;
    comparing the at least one familiar POI with the plurality of proximate POIs;
    determining if the at least one familiar POI matches one of the plurality of proximate POIs;
    prioritizing the at least one familiar POIs based on proximity to the location as well as by a ranking the at least one familiar POI such that any familiar POI is ranked higher than any standard POI, wherein the ranking comprises ranking the at least one familiar POI as one of a high priority POI, a medium priority POI, a low priority POI, and a lowest priority POI;
    providing an indicator that directs the vehicle through the maneuver using a selected POI according to the prioritization as a reference, wherein the at least one familiar POI is used as a reference if the at least one familiar POI matches one of the plurality of proximate POIs; and, wherein the ranking comprises ranking the at least one familiar POI as the high priority POI if the at least one familiar POI has been previously saved in the database as a contact indicating an address of a specific location and if the at least one familiar POI is the destination POI.

2. The method as recited in claim 1, wherein the ranking comprises ranking the at least one familiar POI as the medium priority POI if the at least one familiar POI is a chain establishment and if the at least one familiar POI is the destination POI.

3. The method as recited in claim 1, wherein the ranking comprises ranking the at least one familiar POI as the low priority POI if the at least one familiar POI is not a chain establishment and has not been previously saved in the database as one of an address and a contact, and if the at least one familiar POI is the destination POI.

4. The method as recited in claim 1, wherein the ranking comprises ranking the at least one familiar POI as the lowest priority POI if the at least one familiar POI has been previously saved in the database as a contact indicating an address of a specific location.

5. The method as recited in claim 1, wherein the at least one familiar POI is one of a POI that has been previously been visited by the vehicle, a POI that has been previously saved in the database as a contact indicating an address of a specific location, and a chain establishment.

6. The method as recited in claim 1, comprising saving the at least one familiar POI as a colloquial name.

7. The method as recited in claim 1, comprising providing a visual indicator that directs the vehicle through the maneuver, wherein the visual indicator is a graphic that is shown on a display of the vehicle, and wherein the graphic includes the at least one familiar POI, the plurality of proximate POIs, and the plurality of standard POIs.

8. The method as recited in claim 1, comprising providing an audio indicator that directs the vehicle through the maneuver, wherein the audio indicator is part of an audio system that provides an audio signal.

9. The method as recited in claim 1, wherein both at least a standard and the at least one familiar POI is shown at the same time with the at least one familiar POI being shown using an enlarged view when compared to the plurality of standard POIs and the plurality of proximate POIs.

10. The method as recited in claim 1, comprising providing a plurality of familiar POIs, wherein the plurality of familiar POIs are ranked to how many times each of the plurality of familiar POIs have been visited by the vehicle.

11. A navigation system for a vehicle, the navigational system configured for receiving a signal indicating a current position of the vehicle, comprising:
   at least one indicator; and
   a control module having a processor in communication with the at least one indicator, the control module having a memory including a database that stores at least one familiar POI and a plurality of standard POIs, wherein the plurality of standard POIs represent stock locations, wherein the control module is in communication with a personal electronic device and the at least one familiar POI is a contact that indicates an address of a specific location, and wherein the control module is in communication with the personal electronic device for obtaining the at least one contact that indicates the address of the specific location, the control module comprising:
   a control logic for activating the navigational system, the navigational system providing guidance to a destination
   a control logic for receiving a signal indicating a current geographical position of the vehicle;
   a control logic for determining if the current geographical position of the vehicle requires a maneuver within a specified distance;
   a control logic for selecting and ranking a plurality of POIs based on proximity and status, wherein the plurality of proximate POIs are a portion of the plurality of standard POIs located within a proximate distance to a location where the maneuver will occur;
   a control logic for comparing the at least one familiar POI with the plurality of proximate POIs;
   a control logic for determining if the at least one familiar POI matches one of the plurality of proximate POIs; and
   a control logic for sending a signal to the indicator that directs the vehicle through the maneuver, wherein the indicator uses the at least one familiar POI as a reference if the at least one familiar POI matches one of the plurality of proximate POIs; and
   a control logic for ranking the at least one familiar POI as one of a high priority POI, a medium priority POI, a low priority POI, and a lowest priority POI, wherein the control module includes control logic for ranking the at least one familiar POI as the high priority POI if the at least one familiar POI has been previously saved in the database as a contact indicating an address of a specific location and if the at least one familiar POI is the destination POI.

12. The navigation system as recited in claim 11, wherein the control module includes control logic for ranking the at least one familiar POI as the medium priority POI if the at least one familiar POI is a chain establishment and if the at least one familiar POI is the destination POI.

13. The navigation system as recited in claim 11, wherein the control module includes control logic for ranking the at least one familiar POI as the low priority POI if the at least one familiar POI is not a chain establishment and has not been previously saved in the database as one of an address and a contact, and if the at least one familiar POI is the destination POI.

14. The navigation system as recited in claim 11, wherein the control module includes control logic for ranking the at least one familiar POI as the lowest priority POI if the at least one familiar POI has been previously saved in the database as a contact indicating an address of a specific location.

15. The navigation system as recited in claim 11, wherein the indicator is one of a display and an audio system.

\* \* \* \* \*